(12) United States Patent
Chiu et al.

(10) Patent No.: US 12,378,113 B2
(45) Date of Patent: Aug. 5, 2025

(54) METHODS FOR RECOVERING IODINE (I2)

(71) Applicant: Honeywell International Inc., Charlotte, NC (US)

(72) Inventors: Yuon Chiu, Devnille, NJ (US); Haluk Kopkalli, Staten Island, NY (US); Tao Wang, Shanghai (CN); Kevin Uhrich, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 713 days.

(21) Appl. No.: 17/572,542

(22) Filed: Jan. 10, 2022

(65) Prior Publication Data

US 2022/0219980 A1     Jul. 14, 2022

Related U.S. Application Data

(60) Provisional application No. 63/137,472, filed on Jan. 14, 2021.

(51) Int. Cl.

| | |
|---|---|
| *C01B 7/14* | (2006.01) |
| *B01D 5/00* | (2006.01) |
| *B01D 7/00* | (2006.01) |
| *B01D 53/04* | (2006.01) |
| *B01D 53/14* | (2006.01) |
| *B01D 53/26* | (2006.01) |
| *B01D 53/28* | (2006.01) |
| *B01D 53/68* | (2006.01) |
| *B01J 20/18* | (2006.01) |
| *B01J 20/34* | (2006.01) |

(52) U.S. Cl.
CPC ............. *C01B 7/14* (2013.01); *B01D 5/0027* (2013.01); *B01D 7/00* (2013.01); *B01D 53/04* (2013.01); *B01D 53/1493* (2013.01); *B01D 53/261* (2013.01); *B01D 53/263* (2013.01); *B01D 53/28* (2013.01); *B01J 20/18* (2013.01); *B01J 20/3408* (2013.01); *B01J 20/3483* (2013.01); *B01D 2252/10* (2013.01); *B01D 2252/504* (2013.01); *B01D 2253/116* (2013.01); *B01D 2257/202* (2013.01); *B01D 2257/80* (2013.01); *B01D 2259/40088* (2013.01)

(58) Field of Classification Search
None
See application file for complete search history.

(56) References Cited

U.S. PATENT DOCUMENTS

| 2,385,483 | A | 9/1945 | Wolff | |
| 6,304,367 | B1 * | 10/2001 | Battilana | B01D 53/261 359/333 |
| 2009/0041655 | A1 | 2/2009 | Shoji et al. | |
| 2020/0129881 | A1 | 4/2020 | Tikhonov et al. | |

FOREIGN PATENT DOCUMENTS

| EP | 0361773 A1 | 4/1990 |
| EP | 3385221 A1 | 10/2018 |

OTHER PUBLICATIONS

International Preliminary Report on Patentability received for PCT Patent Application No. PCT/US2022/070158, mailed on Jul. 27, 2023, 8 pages.
International Search Report and Written Opinion received for PCT Patent Application No. PCT/US2022/070158, mailed on Apr. 29, 2022, 12 pages.

* cited by examiner

*Primary Examiner* — Daniel Berns
(74) *Attorney, Agent, or Firm* — Faegre Drinker Biddle & Reath LLP

(57) ABSTRACT

Methods of recovering iodine ($I_2$) from a stream including iodine ($I_2$) vapor and at least one of: an inert gas and water vapor can include contacting the stream with an alkaline solution to form an iodide salt, contacting the stream with an adsorbent to selectively adsorb water from the stream, contacting the stream with a concentrated acid to absorb the water vapor from the stream, desublimating or condensing the iodine ($I_2$) vapor to form solid or liquid iodine ($I_2$), or contacting the stream with a material to condense or desublimate the iodine ($I_2$) vapor from the stream as the material at least one of: absorbs latent heat through a phase change of the material and absorbs sensible heat.

20 Claims, No Drawings

METHODS FOR RECOVERING IODINE (I2)

CROSS-REFERENCE TO RELATED APPLICATION

This application claims priority to Provisional Application No. 63/137,472, filed Jan. 14, 2021, which is herein incorporated by reference in its entirety.

FIELD

The present disclosure relates to processes for recovering iodine ($I_2$) from processes that use iodine ($I_2$), in particular, from processes used for drying iodine ($I_2$).

BACKGROUND

Anhydrous hydrogen iodide (HI) is an important industrial chemical that may be used in the preparation of hydroiodic acid, organic and inorganic iodides, iodoalkanes, and as a reducing agent.

In commercial production of hydrogen iodide (HI), iodine ($I_2$) is often used as the starting material as shown below in Equation 1.

$$H_2 + I_2 \rightarrow 2HI \qquad \text{Equation 1}$$

The raw materials, (iodine and hydrogen) contain water which may be entrained with HI. In turn, the presence of water in hydrogen iodide (HI) creates hydroiodic acid which is corrosive to most alloys, thereby causing damage to downstream manufacturing and processing equipment. The water can also be detrimental to the HI product quality, in some processes.

Additionally, water, iodine ($I_2$) and HI can form a ternary mixture. The presence of water could result in the formation of this mixture, which is also corrosive and may have a detrimental impact on product separation resulting in reduced yields.

Methods used to remove water from iodine ($I_2$) may result in a loss of iodine ($I_2$). Thus, what is needed are methods to recover iodine ($I_2$) that would otherwise be lost.

SUMMARY

The present application provides methods for recovering iodine ($I_2$) from processes that use iodine ($I_2$).

In one embodiment, a method of recovering iodine ($I_2$) includes providing a stream including iodine ($I_2$) vapor and at least one of: an inert gas and water vapor, and contacting the stream with an alkaline solution to form an iodide salt.

In another embodiment, a method of recovering iodine ($I_2$) includes providing a stream including iodine ($I_2$) vapor and water vapor, and contacting the stream with an adsorbent to selectively adsorb water from the stream.

In another embodiment, a method of recovering iodine ($I_2$) includes providing a stream including an inert gas, water vapor, and iodine ($I_2$) vapor, and contacting the stream with a concentrated acid to absorb the water vapor from the stream.

In another embodiment, a method of recovering iodine ($I_2$) includes providing a stream including iodine ($I_2$) vapor and water vapor, and desublimating or condensing the iodine ($I_2$) vapor to form solid or liquid iodine ($I_2$).

In another embodiment, a method of recovering iodine ($I_2$) includes providing a stream including iodine ($I_2$) vapor and at least one of: an inert gas and water vapor, and contacting the stream with a material to condense or desublimate the iodine ($I_2$) vapor from the stream as the material at least one of: absorbs latent heat through a phase change of the material and absorbs sensible heat.

Other embodiments can combine any of the previous embodiments.

DETAILED DESCRIPTION

The present disclosure provides methods for recovering iodine ($I_2$) from gas streams, such as those used to dry iodine. Such methods for drying, or removing water from, iodine ($I_2$) are disclosed in co-pending U.S. Patent Application 63/137,463 entitled "METHODS FOR REMOVING WATER FROM IODINE ($I_2$)", the contents of which is hereby incorporated by reference in its entirety. For example, a method for removing water from iodine ($I_2$) can include contacting the iodine ($I_2$) with a stream of heated nitrogen ($N_2$), air, carbon dioxide ($CO_2$), argon, helium or any other gas that is inert to iodine ($I_2$), such as pentafluoropropane (HFC-245fa), 2,2-dichloro-1,1,1-trifluoroethane (HCFC-123), 1-chloro-1,2,2,2-tetrafluoroethane (HCFC-124), pentafluoroethane (HFC-125), 1,1,1,2-tetrafluoroethane (HFC-134a), difluoromethane (HFC-32), hydrogen iodide (HI), and trifluoroiodomethane ($CF_3I$), for example.

The iodine ($I_2$) can contact the inert gas via a multi-stage stripping column. The iodine ($I_2$) is fed to the top of a multi-stage stripping column, while the inert gas is fed to the bottom of the column. The counter-current contact between the wet iodine ($I_2$) and dry inert gas will progressively increase, thereby removing more water and resulting in the iodine ($I_2$) which emerges at the bottom of the column having a very low residual water content. A reboiler may be incorporated into the column design to assist in driving off the water from the iodine ($I_2$). The inert gas is essentially free of water to begin with, so it will carry out the water with it, leaving behind iodine ($I_2$) with a very low water content. The resulting inert gas stream emerges at the top of the column, carrying with it the removed water and some iodine ($I_2$).

In some embodiments, a series of liquid-vapor contacting devices, such as flash drums or bubblers, in which the liquid and vapor in each device are contact one another in a counter-current flow manner as in the multi-stage column may achieve the same effect as the above-mentioned multi-stage column. The use of discrete contacting devices in series may allow for better management of the iodine ($I_2$) such that de-sublimation or solidification may be prevented when there is insufficient quantity of inert gas in contact with the iodine ($I_2$) at temperatures below 116° C.

In some other embodiments, a single stage liquid-vapor contacting device, such as a flash drum can be used, for example. In some other embodiments, a co-current liquid-vapor contacting device can be used, such as a falling film apparatus, for example. In some embodiments, the iodine ($I_2$) can contact the inert gas during pneumatic conveying of the iodine ($I_2$), in which the gas used to convey the iodine is the inert gas.

Other suitable gases for use in this method will also have low water content in order to effectively strip water from the iodine ($I_2$). Chemical components which exhibit affinity for water or are capable of forming an azeotrope with water are also appropriate for use in this method.

The present disclosure provides methods to recover iodine ($I_2$) from inert gas streams used to dry iodine. Such streams include an inert gas, water removed from the iodine in the drying process, and some iodine carried along in the inert gas stream. This iodine in the drying stream can represent a significant loss of iodine from the process, if not recovered. Recovering iodine ($I_2$) that would otherwise be lost in the drying process results in a more economical process.

In some embodiments, the inert gas can include nitrogen ($N_2$), carbon dioxide, helium, argon, air, hydrogen, hydrogen iodide, or any other gas that is inert to iodine ($I_2$). In some embodiments, the inert gas can include combinations of gases.

The iodine ($I_2$) concentration in the inert gas stream, expressed on a water-free basis, can be as low as about 0.5% by mole, about 1% ppm by mole, about 2% by mole, about 3% by mole, about 5% by mole, about 10% by mole, about 15% by mole, about 20% by mole or about 30% by mole, or as high as about 40% by mole, about 50% by mole, about 60% by mole, about 70% by mole, about 80% by mole, about 90% by mole or about 99% by mole, or be within any range defined between any two of the foregoing values such as about 0.5% by mole to about 99% by mole, about 1% by mole to about 90% by mole, about 2% ppm by mole to about 80% by mole, about 3% by mole to about 70% by mole, about 5% by mole to about 60% by mole, about 10% by mole to about 50% by mole, about 15% by mole to about 40% by mole, about 20% by mole to about 30% by mole, about 10% by mole to about 20% by mole, about 5% by mole to about 15% by mole, or about 30% by mole to about 60% by mole, for example. Preferably, the iodine ($I_2$) concentration in the inert gas stream, expressed on a water-free basis, is from about 3% by mole to about 60% by mole. More preferably, the iodine ($I_2$) concentration in the inert gas stream, expressed on a water-free basis, is from about 5% by mole to about 40% by mole. Most preferably, the iodine ($I_2$) concentration in the inert gas stream, expressed on a water-free basis, is from about 10% by mole to about 20% by mole.

Recovering Iodine ($I_2$) via Treatment with Alkaline Solution

In this method, a stream of inert gas including water vapor and iodine ($I_2$) vapor is treated by scrubbing the inert gas stream with an alkaline solution to remove the iodine ($I_2$) from the inert gas stream. After scrubbing, the inert gas stream may be dried to remove the water by conventional methods, such as refrigerating the nitrogen to condense the residual water (commonly known as de-humidification) and/or passing it through a desiccant. The dry nitrogen may then be recycled to re-use in drying more iodine ($I_2$). The alkaline solution may be recovered as a valuable iodine salt product. The iodide in the recovered alkaline solution or the dried iodide salt can be converted to back to iodine ($I_2$) by methods known in the art, such as by reacting with sulfuric acid or reacting with hydrochloric acid followed by hydrogen peroxide, for example.

The iodide counterion in the alkaline solution may be sodium, potassium, lithium, magnesium or calcium, among others. In some embodiments, the alkaline solution can be an aqueous solution formed from a compound such as sodium hydroxide, potassium hydroxide, lithium hydroxide, magnesium hydroxide or calcium hydroxide, or combinations thereof, for example.

In some embodiments, a reducing agent such as sodium sulfite ($Na_2SO_3$) may optionally be used to convert a hypoiodite ion (e.g. NaOI) to an iodide (e.g. NaI) and a sulfate (e.g. Na2SO4). Other reducing agents may be used such as sodium bisulfite ($NaHSO_3$), potassium sulfite ($K_2SO_3$), potassium bisulfite ($KHSO_3$), calcium sulfite ($CaSO_3$), calcium bisulfite ($Ca(HSO_3)_2$), lithium sulfite ($Li_2SO_3$), lithium bisulfite ($LiHSO_3$), magnesium sulfite ($Mg(SO_3)$, magnesium bisulfite ($Mg(HSO_3)_2$) among other reducing agents.

Recovering Iodine ($I_2$) via Adsorption of Water by a Solid Adsorbent

In this method, a stream of inert gas including water vapor and iodine ($I_2$) vapor is passed through an adsorbent to remove substantially all of the water vapor from the stream. The adsorbent selectively removes the water vapor from the stream. In some embodiments, the dried inert gas stream, still laden with the iodine vapor, is recycled to re-use in drying more iodine ($I_2$). In some embodiments, the dried inert gas stream becomes saturated with iodine ($I_2$). In some other embodiments, the dried inert gas stream with iodine vapor is desublimated to recover solid iodine ($I_2$). The recovered solid iodine ($I_2$) can be recycled for use in the production of HI since it is already dried from the adsorbent.

The adsorbent can be selected from molecular sieves (e.g., 3A, 4A, 5A or XH-9), alumina, calcium sulfate ("Drierite"), silica gel, calcium chloride, sodium sulfate, or combinations of any of these.

When it is desired to regenerate the adsorbent, such as when it no longer adsorbs water at a sufficient rate or when it is convenient to do so, it may be regenerated by first heating the adsorbent to vaporize and recover additional iodine which has adhered to the adsorbent, allowing the iodine to be collected by one or more of the methods disclosed herein (e.g., desublimation, condensation, etc.). In some embodiments, the heating may be done under vacuum to accelerate recovery of the iodine. The adsorbent may be heated to a temperature as low as about 90° C., about 95°, about 100° C., or about 105° C., or as high as about 110° C., about 115° C. or about 120° C., or to a temperature within any range defined between any two of the foregoing values, such as about 90° C. to about 120° C., about 95° C. to about 115° C., about 100° C. to about 110° C., about 105° C. to about 120° C., about 100° C. to about 120° C., or about 90° C. to about 100° C., for example.

Following the removal of residual iodine, the adsorbent can be regenerated by contact with a hot, inert gas, such as nitrogen or air, to desorb the water from the adsorbent. The adsorbent may be regenerated by heating the adsorbent to a temperature as low as about 150° C., about 175°, about 200° C., about 225° C. or about 250° C., or as high as about 275° C., about 300° C., about 325° C. or about 350° C., or to a temperature within any range defined between any two of the foregoing values, such as about 150° C. to about 350° C., about 175° C. to about 325° C., about 200° C. to about 300° C., about 225° C. to about 300° C., about 150° C. to about 250° C., or about 200° C. to about 300° C., for example.

Recovering Iodine ($I_2$) via Absorption of Water by a Concentrated Acid

In this method, a stream of inert gas including water vapor and iodine ($I_2$) vapor is passed through a contactor circulating a concentrated acid. The water vapor is absorbed into the concentrated acid, removing substantially all of the water vapor from the stream. In some embodiments, the dried inert gas stream, still laden with the iodine vapor, is recycled to re-use in drying more iodine ($I_2$). In some other embodiments, the dried inert gas stream with iodine vapor is desublimated to recover solid iodine ($I_2$). The recovered solid iodine ($I_2$) can be recycled for use in the production of HI since it is already dried from by the concentrated acid.

Suitable concentrated acids include sulfuric acid ($H_2SO_4$), hydroiodic acid (HI), phosphoric acid ($H_3PO_4$), and metaphosphoric acid ($HPO_3$). For example, if the concentrated acid is sulfuric acid, the concentration of the sulfuric acid can range from 95% to 100%. In some embodiments, the sulfuric acid is oleum or fuming sulfuric acid.

The contactor can be a counter-current packed or trayed tower in which the inert gas stream including water vapor and iodine ($I_2$) vapor enters at the bottom of the tower and exits at the top of the tower while the liquid concentrated acid is fed into the top of the tower and exits at the bottom of the tower. Alternatively, the contactor can be a co-current packed or trayed tower in which both the inert gas stream including water vapor and iodine ($I_2$) vapor and the concentrated acid flow through the tower in the same direction. Alternatively, the contactor can be a mixed tank in which the inert gas stream including water vapor and iodine ($I_2$) vapor and the liquid concentrated acid are intimately mixed. Alternatively, the contactor can be an educator in which the liquid concentrated acid is circulating through the educator to intimately mix with the inert gas stream including water vapor and iodine ($I_2$) vapor being drawn into the educator. The contactor can include multiple contactor units.

Recovery of Iodine ($I_2$) by De-Sublimation

In this method, a stream of inert gas including water vapor and iodine ($I_2$) vapor is contacted with a cold surface to desublimate the iodine, recovering it as solid iodine ($I_2$). The de-sublimation temperature may be low enough to freeze the water out of the iodine ($I_2$) to maximize the recovery yield. After re-melting, the recovered mixture of iodine ($I_2$) and water forms a biphasic liquid in which one layer is rich in water and the other rich in iodine ($I_2$). When the iodine ($I_2$)/water mixture is re-melted at about 114° C. to 160° C. and at or near atmospheric pressure, most of the water will evaporate, leaving heated, molten iodine ($I_2$) readily available for recycling to an iodine ($I_2$) drying step. Alternatively, the lighter water-rich layer may be decanted off for disposal, while the heaver iodine ($I_2$)-rich layer may be recycled back to an iodine ($I_2$) drying step.

The de-sublimation temperature can be as low as about −45° C., about −30° C., about −10° C., about 0° C., about 10° C., about 20° C., or as high as about 35° C., about 40° C., about 50° C., about 60° C., about 66° C., about 80° C., about 90° C. or about 100° C., or to a temperature within any range defined between any two of the foregoing values, such as about −45° C. to about 100° C., about −30° C. to about 90° C., about −20° C. to about 80° C., about −10° C. to about 66° C., about 0° C. to about 60° C., about 10° C. to about 50° C., about 20° C. to about 40° C., about 35° C. to about 66° C., about 20° C. to about 80° C. or about 10° C. to about 60° C., for example. Preferably, the de-sublimation temperature is from about 35° C. to about 66° C.

Alternatively, in some embodiments, the stream of inert gas including water vapor and iodine ($I_2$) vapor is subjected de-sublimation at a temperature sufficient to selectively solidify the iodine ($I_2$) with essentially no condensing or solidifying of the water in the stream. The bulk of the iodine ($I_2$) may then be collected as a solid, while a small remaining amount is carried away in the nitrogen/inert gas and water vapor stream. The solid iodine ($I_2$) can then be re-melted and recycled back to an iodine ($I_2$) drying step.

In such embodiments, the de-sublimation temperature can be as low as low as about 0° C., about 10° C., about 20° C., about 30° C., about 35° C., about 40° C., about 45° C. or about 50° C., or be as high as about 55° C., about 60° C., about 65° C., about 70° C., about 80° C., about 90° C. or about 100° C., or to a temperature within any range defined between any two of the foregoing values, such as about 0° C. to about 100° C., about 10° C. to about 90° C., about 20° C. to about 80° C., about 30° C. to about 70° C., about 35° C. to about 65° C., about 40° C. to about 60° C., about 45° C. to about 55° C., about 35° C. to about 55° C., about 20° C. to about 35° C., or about 55° C. to about 90° C., for example. Preferably, the de-sublimation temperature is from about 35° C. to about 55° C.

When the stream of inert gas effluent laden with iodine ($I_2$) is passed through a de-sublimator at 65° C. and atmospheric pressure, for example, the iodine ($I_2$) may be recovered as a solid without excess water and may then be subjected to re-melting and recycling to be dried. The yield of iodine ($I_2$) following recovery from the inert gas effluent is about 89%. Using 1000 pounds of iodine ($I_2$) as a basis, this translates to reducing the overall iodine ($I_2$) loss in drying to about 0.3%, or 3.3 pounds of iodine ($I_2$) loss per 1000 pounds of iodine ($I_2$) to be dried. The loss occurs from venting the inert gas after desublimation, which includes some residual iodine ($I_2$).

The de-sublimator may be constructed with a set of ten, ten-foot long, four- to six-inch diameter jacketed glass lined pipes or pipes lined (or formed of) other suitable materials, such as Hastelloy® C, for example. Such a system may be operated through several cycles per day in a batch operating mode. The operating cycle temperature can be between the de-sublimation temperature and about 175° C., alternating between cooling to recover the iodine by desublimation and heating to remove the recovered iodine from the de-sublimator.

Recovery of Iodine ($I_2$) by De-Sublimation in Water

In this method, a stream of inert gas including water vapor and iodine ($I_2$) vapor is contacted with water at a temperature low enough to desublimate the iodine, recovering it as solid iodine ($I_2$). The recovered mixture of iodine ($I_2$) and water forms a biphasic liquid in which one layer is rich in water and the other rich in iodine ($I_2$). The biphasic mixture may then be separated by liquid-liquid extraction. The top layer, or water-rich phase, may be decanted off and recycled to be used to contact more of the stream of inert gas including water vapor and iodine ($I_2$) vapor. The bottom layer, or iodine-rich phase, still containing some un-decanted water, can be heated to melt the iodine. After melting, the molten iodine is estimated to contain less than 0.15 wt. % of water. This molten iodine can then be recycled back to an iodine ($I_2$) drying step. Alternatively, or additionally, the molten iodine can be contacted with an adsorbent or absorbent to extract much of the remaining water from the molten iodine and into the adsorbent or absorbent. The adsorbent or absorbent can any described herein, such as concentrated sulfuric acid or molecular sieves, for example.

In such embodiments, the water can be at a temperature as low as about 0° C., about 5° C., about 10° C., about 15° C., about 20° C., about 25° C., about 30° C., about 35° C., about 40° C. or about 45° C., or as high as about 50° C., about 55° C., about 60° C., about 65° C., about 70° C., about 75° C., about 80° C., about 85° C., about 90° C. or about 95° C. or to a temperature within any range defined between any two of the foregoing values, such as about 0° C. to about 95° C., about 5° C. to about 90° C., about 10° C. to about 85° C., about 15° C. to about 80° C., about 20° C. to about 75° C., about 25° C. to about 70° C., about 30° C. to about 65° C., about 35° C. to about 60° C., about 40° C. to about 55° C., about 45° C. to about 50° C., about 5° C. to about 45° C. or about 20° C. to about 30° C., for example. Preferably, the de-sublimation temperature is from about 5° C. to about 45° C.

In some embodiments, the contact may be in a water pool vessel lined with glass or a polymer, such as polyethylene, polypropylene or a fluoropolymer such as tetrafluoroethylene or polyvinylidene fluoride, for example. In some embodiments, the vessel is formed of a compatible metal alloy or a polymer.

Recovery of Iodine ($I_2$) by Condensation in Water

In this method, a stream of inert gas including water vapor and iodine ($I_2$) vapor is contacted with water at a temperature low enough to condense the iodine, but high enough to maintain the iodine ($I_2$) in a liquid state. The recovered mixture of iodine ($I_2$) and water forms a biphasic liquid in which one layer is rich in water and the other rich in iodine ($I_2$). The biphasic mixture may then be separated by liquid-liquid extraction. The top layer, or water-rich phase, may be decanted off and recycled to be used to contact more of the stream of inert gas including water vapor and iodine ($I_2$) vapor. The bottom layer, or iodine-rich phase, can then be recycled back to an iodine ($I_2$) drying step.

In such embodiments, the water can be at a temperature as low as about 95° C., about 100° C., about 105° C., about 110° C., about 115° C. or about 120° C., or as high as about 125° C., about 130° C., about 135° C., about 140° C., about 145° C. or about 150° C., or to a temperature within any range defined between any two of the foregoing values, such as about 95° C. to about 150° C., about 100° C. to about 145° C., about 105° C. to about 140° C., about 110° C. to about 135° C., about 115° C. to about 130° C., about 120° C. to about 125° C., about 110° C. to about 120° C., about 95° C. to about 115° C., about 130° C. to about 150° C. or about 105° C. to about 125° C., for example. Preferably, the de-sublimation temperature is from about 110° C. to about 120° C. The water will be at superatmospheric pressure at temperatures exceeding about 100° C.

In some embodiments, the contact may be in a water pool vessel lined with glass or a polymer, such as polyethylene, polypropylene or a fluoropolymer such as tetrafluoroethylene or polyvinylidene fluoride, for example. In some embodiments, the vessel is formed of a compatible metal alloy or a polymer.

Recovery of $I_2$ by De-Sublimation or Condensing using Latent Heat or Sensible Heat Transfer In this method, a stream of inert gas including water vapor and iodine ($I_2$) vapor is contacted by a material to condense and/or de-sublimate the iodine ($I_2$) from the stream as the material absorbs latent heat through a phase change of the material and/or absorbs sensible heat, thus cooling the iodine ($I_2$). Suitable materials may include carbon dioxide ($CO_2$), for example. The carbon dioxide ($CO_2$) may initially be in the solid phase (as dry ice) at atmospheric pressure, or a liquid phase at an elevated pressure. The contact temperature is preferably selected to result in the stream of inert gas including water vapor and iodine ($I_2$) reaching a cooling temperature low enough to achieve a high iodine ($I_2$) recovery.

The cooling temperature can be as low as low as about −40° C., about −30° C., about −20° C., about −10° C., about 0° C. or about 10° C., or as high as about 20° C., about 30° C., about 40° C., about 50° C., about 60° C. or about 70° C., or to a temperature within any range defined between any two of the foregoing values, such as about −40° C. to about 70° C., about −30° C. to about 60° C., about −20° C. to about 50° C., about −10° C. to about 40° C., about 0° C. to about 30° C., about 10° C. to about 20° C., about 20° C. to about 50° C., about −30° C. to about 10° C., about 30° C. to about 60° C. or about 30° C. to about 40° C., for example. Preferably, the cooling temperature is from about 20° C. to about 50° C.

Other suitable materials include subcooled liquids such as nitrogen, 1,1,1,3,3-pentafluoropropane (HFC-245fa), HCFC-244bb and other inert halocarbons such as pentafluoroethane (HFC-125), HFC-134a, HFC-32 and trifluoroiodomethane ($CF_3I$), for example. Other suitable materials include subcooled gases such as nitrogen, carbon dioxide, 1,1,1,3,3-pentafluoropropane (HFC-245fa), and other inert halocarbons such as pentafluoroethane (HFC-125), HFC-134a, HFC-32, $CF_3I$, HCFC-244bb, alkanes such as methane, ethane, propane, for example. In some embodiments, frozen water can be used.

The de-sublimated or condensed iodine ($I_2$), containing a small amount of the material with which it was contacted for cooling, may be removed as is or may be melted to facilitate transferring as a molten liquid. In either case, the iodine ($I_2$) may be recycled back to the desired iodine ($I_2$) drying step.

All methods described herein may be used in a batch, semi-batch, or continuous process. All methods described herein may be conducted at subatmospheric, atmospheric, or superatmospheric pressure.

While this invention has been described as relative to exemplary designs, the present invention may be further modified within the spirit and scope of this disclosure. Further, this application is intended to cover such departures from the present disclosure as come within known or customary practice in the art to which this invention pertains.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" is also considered as disclosing the range defined by the absolute values of the two endpoints.

The following non-limiting Examples serve to illustrate the disclosure.

EXAMPLES

Example 1

Prophetic Example of Recovering Iodine ($I_2$) by Treatment with an Alkaline Solution A sample of inert gas including water vapor and iodine ($I_2$) vapor contains 19 pounds nitrogen, 30 pounds of iodine ($I_2$), and 2.5 pounds of water for every 1000 pounds of iodine ($I_2$) to be dried. This nitrogen effluent is sent to a packed tower scrubber to convert the iodine ($I_2$) into a salt solution by reacting it with a circulating aqueous alkaline solution comprising 7.6 wt. % sodium hydroxide (NaOH) and 11.9 wt. % sodium sulfite ($Na_2SO_3$). The iodine ($I_2$) reacts with the alkaline solution as shown below in Equation 2, to produce sodium iodide and sodium sulfate.

$$I_2 + 2\ NaOH + Na_2SO_3 \longrightarrow 2\ NaI + Na_2SO_4 + H_2O \quad \text{Equation 2}$$

Once the starting aqueous alkaline solution is consumed, it will result in a final product solution having the composition shown below in Table 1 for every 1000 pounds of iodine ($I_2$) to be dried as calculated to account for the mass balance of the reaction.

TABLE 1

| | Stoichiometric equivalent | MW | Initial Reactant Mass, lb | Initial Reactant wt. % | Final Product Mass, lb | Final Product wt. % |
|---|---|---|---|---|---|---|
| $N_2$ Effluent | | | | | | |
| $I_2$ | 1 | 254 | 30.0 | | | |
| $H_2O$ removed from $I_2$ | NA | 18 | 2.5 | | | |
| Alkaline Scrubbing Solution | | | | | | |
| NaOH | 2 | 40 | 9.4 | 7.6% | | |
| $Na_2SO_3$ | 1 | 126 | 14.9 | 11.9% | | |
| $H_2O$ from Alkaline Sol'n | NA | 18 | 100.7 | 80.5% | | |
| Resulting Salt Solution | | | | | | |
| NaI | 2 | 150 | | | 35.4 | 22.5% |
| $Na_2SO_4$ | 1 | 142 | | | 16.8 | 10.6% |
| $H_2O$ from Reaction | 1 | 18 | | | 2.1 | 1.3% |
| $H_2O$ removed from $I_2$ | NA | 18 | | | 2.5 | 1.6% |
| $H_2O$ from Alkaline Sol'n | NA | 18 | | | 100.7 | 63.9% |
| Mass Balance Check | | | 157.5 | | 157.5 | 100.0% |

Example 2

Prophetic Example of Recovery of Iodine ($I_2$) Adhered to Molecular Sieves

A sample of inert gas including water vapor and iodine ($I_2$) vapor contains 19 pounds of nitrogen, 30 pounds of iodine ($I_2$), and 2.5 pounds of water for every 1000 pounds of iodine ($I_2$) to be dried. This nitrogen effluent is fed to an 8:1 L/D vessel filled with 4 Å molecular sieves. Operating at 116° C., it is estimated that the water content of the nitrogen effluent may be reduced from the initial 117,000 ppm by weight to less than 1000 ppm by weight. This dried nitrogen will have 99% of its water content removed by the molecular sieves, and although it still includes iodine ($I_2$), it may be readily re-used or recycled to dry iodine ($I_2$).

At 116° C. and atmospheric pressure, the 4 Å molecular sieves are estimated to have the static water capacity shown below in Table 2, assuming the regenerated molecular sieves have zero residual water content.

TABLE 2

| $N_2$ water content (ppm) | Water weight per 100 lb of molecular sieves |
|---|---|
| 1000 | 4.5 |
| 5000 | 9.0 |
| 10,000 | 12.0 |
| 50,000 | 17.0 |
| 100,000 | 18.0 |

Using the above static adsorption capacity, an integral static capacity of 12 pounds of water is estimated per 100 pounds of molecular sieves in order to reach a water content of 1000 ppm by weight in nitrogen at atmospheric pressure and 116° C. For continuous dynamic operation, a conservative 50% of the static capacity is assumed to account for mass transfer, residual water content after regeneration, and loss of adsorption efficiency due to aging of molecular sieves or co-adsorption of impurities. This computes to 6 pounds water per 100 pounds of molecular sieves for estimating the adsorption bed size and cycle time.

Example 3

Iodine ($I_2$) Recovery with a De-Sublimator

A bench-scale de-sublimator was constructed featuring a 4-inch diameter by 10-inch long jacketed pipe, with and without a spiral baffle insert. The de-sublimator was designed such that iodine ($I_2$) solidifies within the pipe. Alternatively, the de-sublimator can be designed such that iodine ($I_2$) solidifies on an outer surface of the pipe. A commercial-scale design is expected to realize several-fold increases in performance, due in part to the higher heat transfer rates typically realized at commercial scale through the use of contact fins or enhanced surface devices.

The inlet temperature for the device with baffles was 87.3° C. The body of the de-sublimator ranged from 40.4° C. at the side closest to the inlet to 41.1° C. in the center of the pipe, to 37.6° C. at the side of the outlet. The outlet temperature was 38.3° C. For the device without baffles, the inlet temperature was 94.5° C. The temperature within the pipe ranged from 40.3° C. at the side closest to the inlet, to 40.2° C. at the center of the pipe, to 36.4° C. at the side of the pipe closest to the outlet. The outlet temperature was 40.1° C. The average temperature of the de-sublimators was about 40° C.

Table 3 below shows data for flowrates and iodine ($I_2$) collection amounts for the bench-scale devices with and without baffles ("Baffled" and "Un-baffled", respectively).

TABLE 3

| | Un-baffled | Un-baffled | Baffled | Baffled |
|---|---|---|---|---|
| $I_2$ Vapor flowrate g/hr | 7.1 | 3.8 | 4.5 | 3.3 |
| Approx. inert gas flowrate g/hr | 64.8 | 54.4 | 59.2 | 57.1 |
| $I_2$ Collected in de-sublimator before loss of performance (g) | 324.0 | 177.0 | 275.0 | 205.0 |
| Lbs $I_2$ collected/ft$^2$ of de-sublimator cold surface (lb/ft$^2$) | 0.53 | 0.29 | 0.45 | 0.34 |
| Lbs $I_2$ collected/ft$^3$ of de-sublimator cold volume (lb/ft$^3$) | 11.4 | 6.2 | 9.7 | 7.2 |
| Solid occupation volume (% de-sublimator cold volume) | 4.6 | 2.5 | 3.9 | 2.9 |

Example 4

Prophetic Example of Iodine ($I_2$) Recovery by Desublimation

A sample of inert gas including water vapor and iodine ($I_2$) vapor contains 19 pounds of nitrogen, 30 pounds of iodine ($I_2$), and 2.5 pounds of water for every 1000 pounds of iodine ($I_2$) to be dried. This nitrogen effluent is fed into a de-sublimator or cold trap to solidify out the iodine ($I_2$) at a temperature selected such that the majority of the water in the incoming nitrogen effluent feed remains un-condensed.

Table 4 below summarizes the expected iodine ($I_2$) recovery efficiency and the quantity of water co-condensed versus the de-sublimation temperature at atmospheric pressure. The preferred de-sublimation temperature for the stream is between 35° C. and 66° C., at which high iodine ($I_2$) recovery (greater than 88 percent) is achieved, with very little incoming water co-condensed with the solidified iodine ($I_2$). This provides recovered iodine ($I_2$) for recycling back to the desired iodine ($I_2$) drying process, without the need for further processing.

TABLE 4

| Component | Feed to desublimator, lbs/hr | Effluent exit (lbs/hr) Desublimation Temperature ° C. | | | |
| --- | --- | --- | --- | --- | --- |
| | | 80 | 66 | 38 | 10 |
| $N_2$ | 19.0 | 19.0 | 19.0 | 19.0 | 19.0 |
| $I_2$ | 29.6 | 6.4 | 3.3 | 0.7 | 0.1 |
| $H_2O$ | 2.5 | 2.49 | 2.48 | 2.40 | 0.23 |
| $I_2$ Recovered lb/hr | | 23.2 | 26.3 | 28.9 | 29.5 |
| % $I_2$ recovery | | 78.4 | 88.8 | 97.5 | 99.8 |
| $H_2O$ content in recovered $I_2$ (ppm) | | 474 | 799 | 3534 | 76,835 |

Example 5

Prophetic Example of Recovery of Iodine ($I_2$) by Condensation Using Heated Water A sample of inert gas including water vapor and iodine ($I_2$) vapor contains 19 pounds of nitrogen, 30 pounds of iodine ($I_2$), and 2.5 pounds of water for every 1000 pounds of iodine ($I_2$) to be dried. The nitrogen effluent is fed into a pool or container of heated water at operating at 116° C. and 25 psig. This water temperature may be maintained by applying steam to a jacketed vessel, a steam coil, or direct steam injection into the water.

The heated water pool or container is designed to provide for vapor-liquid contact. This may be accomplished using mild agitation, gas sparging to promote self-stirring, baffles, in-line mixing with or without a static mixer, or circulating eductor, among other methods.

Under these operating conditions, 50 pounds of water (fresh makeup liquid and recycled light-phase water as further described below) is needed to compensate for water vapor loss when the nitrogen effluent exits the heated water pool, as well as providing excess liquid water to make direct contact with the incoming nitrogen effluent. The excess liquid water may be used to maintain the 116° C. temperature so as to permit the condensation of the iodine ($I_2$) as opposed to de-sublimation or solidification of the iodine ($I_2$) from the nitrogen effluent.

After contacting the nitrogen effluent with the heated water, the nitrogen vented off from the heated water pool will contain essentially all of the incoming nitrogen (19 pounds), 17 pounds of evaporated water vapor, and one pound of residual iodine ($I_2$), thus realizing a 97 percent recovery efficiency of iodine ($I_2$).

The heated water pool will include a mixture comprising 29 pounds of iodine ($I_2$) and 35 pounds of water after accounting for the water evaporation loss and the water coming in with the nitrogen effluent. This mixture is allowed to settle for 30 minutes prior to phase separation to remove the iodine ($I_2$)-rich phase. This iodine ($I_2$) phase is estimated to contain water at a concentration of about 2 mole percent, or 0.15 wt. %. However, upon de-pressurizing, most of the residual water would evaporate off from the molten liquid iodine ($I_2$) at 116° C., with little further loss of iodine ($I_2$). The iodine ($I_2$) thus recovered may be recycled back to the desired drying step.

The lighter, water-rich phase is estimated to contain 0.05 mole percent or 0.7% wt. of dissolved iodine ($I_2$), and this water-rich phase may be re-used in the iodine ($I_2$) recovery process. This method may be employed as a batch, semi-batch, or continuous process.

Example 6

Prophetic Example of Recovery of Iodine ($I_2$) by Desublimation Using Cool Water A sample of inert gas including water vapor and iodine ($I_2$) vapor contains 19 pounds of nitrogen, 30 pounds of iodine ($I_2$), and 2.5 pounds of water for every 1000 pounds of iodine ($I_2$) to be dried. The nitrogen effluent is fed into a pool or container of water operating at 38° C., and at near atmospheric pressure. This water temperature can be maintained by jacketed cooling, cooling coil, direct addition of ice or other cryogenic fluid such as dry ice, or simply starting with cold water and warming it to 38° C.

The cold water pool or container is initially filled with approximately 300 pounds of water designed to provide for vapor-liquid contact. This may be accomplished using mild agitation, gas sparging to promote self-stirring, baffles, in-line mixing with or without a static mixer, circulating eductor, or other suitable method. This larger water volume is selected perpetuate the formation of a mixture including about 10 wt. % solid iodine ($I_2$) to facilitate handling of the mixture.

After contacting the nitrogen effluent with cool water, the nitrogen being vented from the cold water pool will include nearly all of the incoming nitrogen (19 pounds), 0.14 pounds of water vapor, and 0.04 pounds of residual iodine ($I_2$), representing a 99.8% efficiency in iodine ($I_2$) recovery.

The cold water pool will include about 29 pounds of iodine ($I_2$). This mixture allowed to settle for 10 minutes prior to phase separation to decant off the lighter water-rich phase. The water-rich phase is estimated to contain 0.05 wt. % of dissolved iodine ($I_2$) at 38° C. and may be re-used to in the recovery process.

The heavy wet, iodine-rich precipitate may be processed as a slurry or alternatively as a filtered solid. The recovered wet iodine in the form of a slurry or filter cake can be heated to 116° C. to melt the solid iodine ($I_2$) as well as evaporate most of the water. This molten iodine ($I_2$) can be removed and recycled back to the desired drying step. The molten iodine ($I_2$) is estimated to contain less than 0.15 wt. % water.

The iodine ($I_2$) recovery process using this cold water method may be performed in a batch, semi-batch, or continuous process.

Example 7

Prophetic Example of Iodine ($I_2$) Recovery by Desublimation Using Solid $CO_2$ From the iodine ($I_2$) drying methods described above, the nitrogen effluent used for drying contains 19 pounds of nitrogen, 30 pounds of iodine ($I_2$), and 2.5 pounds of water for every 1000 pounds of iodine ($I_2$) to be dried. This nitrogen effluent is fed into a container of dry ice (solid $CO_2$) at near atmospheric pressure. The direct contact between the drying nitrogen effluent and the solid $CO_2$ will result in the heating and evaporation of the $CO_2$. This direct heat transfer will result in cooling the nitrogen effluent, leading to de-sublimation of the iodine ($I_2$).

The container is initially filled with approximately 19 pounds of solid $CO_2$, which is calculated to provide about 20% excess cooling. The container is designed for direct contact between the nitrogen effluent and the solid $CO_2$. This may be accomplished using mild agitation, gas sparging to promote self-stirring, baffles, or other methods. The contactor design may also include in-line mixing packed with solid $CO_2$, or other equipment as desired.

After the nitrogen effluent contacts the solid $CO_2$ and is cooled to 35° C. or less, any of the nitrogen stream vented off will comprise most of the incoming nitrogen (19 pounds) 16 pounds of $CO_2$ vapor, 2.4 pounds of water vapor, and 1.0 pounds of residual iodine ($I_2$), resulting in a 96% efficiency in the recovery of iodine ($I_2$).

After depleting the solid $CO_2$ or having processed all of the nitrogen effluent, the de-sublimed iodine ($I_2$) along with any remaining solid $CO_2$ and any localized water ice, may be heated to remove the $CO_2$ and water. The remaining 28.5 pounds of iodine ($I_2$), which is estimated to contain 2100 ppm water by weight, is removed as is or melted to facilitate transfer as a liquid for recycling back to the desired drying step.

In the event that the remaining iodine ($I_2$) has a higher water content due to entrapped water ice, iodine ($I_2$) may be heated to 116° C. to melt the solid iodine ($I_2$). This molten iodine ($I_2$) may be removed as is for recycling back to the desired drying step. The molten iodine ($I_2$) is estimated to contain solubilized water in an amount of less than 0.15 wt. %.

Table 5 (below) shows the amount of iodine recovered using this method at 66° C., 38° C., and 10° C.

TABLE 5

| Component | Feed to de-sublimator, lbs/hr | Effluent exit (lbs/hr) Desublimation Temperature ° C. | | | |
|---|---|---|---|---|---|
| | | 66 | 38 | 10 | −40 |
| $N_2$ | 19.0 | 19.0 | 19.0 | 19.0 | 19.0 |
| $I_2$ | 29.6 | 4.3 | 1.08 | 0.12 | 0.002 |
| $H_2O$ | 2.5 | 2.49 | 2.44 | 0.5 | 0.02 |
| $CO_2$ | * | 12.00 | 15.88 | 29.4 | 39.3 |
| $I_2$ Recovered lb/hr | | 25.3 | 28.5 | 29.5 | 29.6 |
| % $I_2$ recovery | | 85.5 | 96.2 | 99.6 | 99.9 |

* $CO_2$ is charged at a rate of 14 lb/hr for a desublimation temperature of 66° C., 19 lb/hr for a desublimation temperature of 38° C., 35 lb/hr for a desublimation temperature of 10° C., and 40 lb/hr for a desublimation temperature of −40° C.

Example 8

Prophetic Example of Iodine ($I_2$) Recovery by Treatment with a Concentrated Acid A sample of inert gas including water vapor and iodine ($I_2$) vapor contains 19 pounds of nitrogen, 30 pounds of iodine ($I_2$), and 2.5 pounds of water for every 1000 pounds of iodine ($I_2$) to be dried. This nitrogen effluent is fed to the bottom of a counter-current packed tower. Hot circulating 98% wt. $H_2SO_4$ is fed to the top of the packed tower. The feed streams and the entire packed tower are to be maintained at a hot temperature above about 116° C. when operating at atmospheric pressure to prevent de-sublimating iodine ($I_2$) that would otherwise be lost into the liquid $H_2SO_4$.

It is estimated that the water content of the nitrogen effluent may be reduced from the initial 117,000 ppm by weight to less than 1,000 ppm by weight. This dried nitrogen will have 99% of its water content removed by the concentrated $H_2SO_4$, and although it still includes iodine ($I_2$), it may be readily re-used or recycled to dry iodine ($I_2$).

Depending on the packing choice, a packed tower of approximate 12" diameter×18 ft overall height is more than sufficient to carry out the drying of the nitrogen effluent laden with water and Iodine. Using 7 GPM/ft$^2$ circulating 98% wt. $H_2SO_4$ to achieve good liquid distribution and mass transfer, the hot $H_2SO_4$ circulating flow is calculated to be about 2,500 lb/hr.

Typically, a reservoir of 200 gallons or 2,500 lbs of 98% wt. $H_2SO_4$ for this example scale is used until the circulating $H_2SO_4$ has reached a concentration of about 95% wt. $H_2SO_4$, at which time the spent $H_2SO_4$ will be disposed of and replaced with fresh 98% wt. $H_2SO_4$. The estimated 98% wt. $H_2SO_4$ consumption is 85 lbs per 1,000 lbs of iodine ($I_2$).

ASPECTS

Aspect 1 is a method of recovering iodine ($I_2$), the method including providing a stream including iodine ($I_2$) vapor and at least one of: an inert gas and water vapor, and contacting the stream with an alkaline solution to form an iodide salt.

Aspect 2 is the method of Aspect 1, wherein the alkaline solution is an aqueous solution formed from a compound selected from the group consisting of: sodium hydroxide, potassium hydroxide, lithium hydroxide, magnesium hydroxide or calcium hydroxide, sodium sulfite ($Na_2SO_3$), sodium bisulfite ($NaHSO_3$), potassium sulfite ($K_2SO_3$), potassium bisulfite ($KHSO_3$), calcium sulfite ($Ca(SO_3)$, calcium bisulfite ($Ca(HSO_3)_2$, lithium sulfite ($Li_2SO_3$), lithium bisulfite ($LiHSO_3$), magnesium sulfite ($Mg(SO_3)$, magnesium bisulfite ($Mg(HSO_3)_2$), and combinations thereof.

Aspect 3 is the method of Aspect 1 or Aspect 2, further including converting iodide in the iodide salt to iodine ($I_2$).

Aspect 4 is the method of any of Aspects 1-3, wherein in the providing step, the stream is provided from an iodine ($I_2$) drying process, the stream including water vapor.

Aspect 5 is the method of any of Aspects 1-4, wherein the stream includes an inert gas.

Aspect 6 is a method of recovering iodine ($I_2$), the method including providing a stream including iodine ($I_2$) vapor and water vapor, and contacting the stream with an adsorbent to selectively adsorb water from the stream.

Aspect 7 is the method of Aspect 6, wherein in the providing step, the stream is provided from an iodine ($I_2$) drying process.

Aspect 8 is the method of Aspect 7, further including recycling the iodine ($I_2$) vapor to the iodine ($I_2$) drying process after the contacting step.

Aspect 9 is the method of Aspect 6 or Aspect 7, further including desublimating the iodine ($I_2$) vapor after the contacting step to recover iodine ($I_2$).

Aspect 10 is the method of any of Aspects 6-9, wherein the adsorbent is selected from the group consisting of: a 3A, 4A, 5A or XH-9 molecular sieve, alumina, calcium sulfate, silica gel, calcium chloride, sodium sulfate, calcium iodide, magnesium chloride, magnesium iodide, or combinations thereof.

Aspect 11 is the method of any of Aspects 6-10, further including regenerating the adsorbent by heating the adsorbent to a temperature of from 90° C. to 120° C. to vaporize iodine adhered to the adsorbent, and then heating the adsorbent to from about 150° C. to about 350° C. to desorb the water from the adsorbent.

Aspect 12 is the method of any of Aspects 6-11, wherein the stream further includes an inert gas.

Aspect 13 is a method of recovering iodine ($I_2$), the method including providing a stream including iodine ($I_2$)

vapor and water vapor, and contacting the stream with a concentrated acid to absorb the water vapor from the stream.

Aspect 14 is the method of Aspect 13, wherein in the providing step, the stream is provided from an iodine ($I_2$) drying process.

Aspect 15 is the method of Aspect 14, further including recycling the iodine ($I_2$) vapor to the iodine ($I_2$) drying process after the contacting step.

Aspect 16 is the method of Aspect 13 or Aspect 14, further including desublimating the stream after the contacting step to recover iodine ($I_2$).

Aspect 17 is the method of any of Aspects 13-16, wherein the concentrated acid is selected from the group consisting of: sulfuric acid ($H_2SO_4$), hydroiodic acid (HI), phosphoric acid ($H_3PO_4$) and meta-phosphoric acid ($HPO_3$).

Aspect 18 is the method of any of Aspects 13-17, wherein the stream further includes an inert gas.

Aspect 19 is a method of recovering iodine ($I_2$), the method including providing a stream including iodine ($I_2$) vapor and water vapor, and desublimating or condensing the iodine ($I_2$) vapor to form solid or liquid iodine ($I_2$).

Aspect 20 is the method of Aspect 19, wherein desublimating or condensing the iodine ($I_2$) vapor includes contacting the stream with a surface at a temperature from about −45° C. to about 100° C.

Aspect 21 is the method of Aspect 20, further including melting the solid iodine ($I_2$) to form a biphasic mixture.

Aspect 22 is the method of Aspect 19, wherein water is evaporated from the biphasic mixture by heating the mixture to from about 114° C. to about 160° C.

Aspect 23 is the method of Aspect 19, wherein desublimating or condensing the iodine ($I_2$) vapor includes contacting the stream with a surface at a temperature from about 0° C. to about 100° C. to desublimate or condense the iodine ($I_2$) without solidifying the water vapor.

Aspect 24 is the method of Aspect 19, wherein desublimating or condensing the iodine ($I_2$) vapor includes contacting the stream with water at a temperature of about 90° C. to about 150° C. to condense the iodine ($I_2$).

Aspect 25 is the method of Aspect 19, wherein desublimating or condensing the iodine ($I_2$) vapor includes contacting the stream with liquid water to desublimate the iodine ($I_2$).

Aspect 26 is the method of any of Aspects 19-25, further including drying the solid or liquid iodine ($I_2$).

Aspect 27 is the method of any of Aspects 19-26, wherein the stream further includes an inert gas.

Aspect 28 is the method of any of Aspects 19-27, wherein in the providing step, the stream is provided from an iodine ($I_2$) drying process.

Aspect 29 is a method of recovering iodine ($I_2$), the method including providing a stream including iodine ($I_2$) vapor and at least one of: an inert gas and water vapor, and contacting the stream with a material to condense or desublimate the iodine ($I_2$) vapor from the stream as the material at least one of: absorbs latent heat through a phase change of the material and absorbs sensible heat.

Aspect 30 is the method of Aspect 29, wherein in the contacting step, the stream reaches a temperature of from −40° C. to 70° C.

Aspect 31 is the method of Aspect 29 or Aspect 30, wherein the material is selected from the group consisting of: solid carbon dioxide, ice, subcooled liquids such as: nitrogen, carbon dioxide, 1,1,1,3-pentafluoropropane (HFC-245fa), HCFC-244bb, pentafluoroethane (HFC-125), HFC-134a, HFC-32 and trifluoroiodomethane ($CF_3I$); and subcooled gases such as nitrogen, carbon dioxide, 1,1,1,3,3-pentafluoropropane (HFC-245fa), pentafluoroethane (HFC-125), HFC-134a, HFC-32, $CF_3I$, HCFC-244bb, alkanes such as methane, ethane, and propane.

Aspect 32 is the method of any of Aspects 29-31, wherein in the providing step, the stream is provided from an iodine ($I_2$) drying process, the stream including water vapor.

Aspect 33 is the method of any of Aspects 29-32, wherein the stream includes an inert gas.

Aspect 34 is a method of recovering iodine ($I_2$), the method including providing a stream from an iodine ($I_2$) drying process, the stream including iodine ($I_2$) vapor, an inert gas and water vapor, and contacting the stream with an alkaline solution to form an iodide salt, wherein the alkaline solution is an aqueous solution formed from a compound selected from the group consisting of: sodium hydroxide, potassium hydroxide, sodium sulfite ($Na_2SO_3$), potassium sulfite ($K_2SO_3$) and combinations thereof.

Aspect 35 is a method of recovering iodine ($I_2$), the method including providing a stream from an iodine ($I_2$) drying process, the stream including iodine ($I_2$) vapor, an inert gas and water vapor; contacting the stream with an adsorbent to selectively adsorb water from the stream; and recycling the iodine ($I_2$) vapor to the iodine ($I_2$) drying process after the contacting step, wherein the adsorbent is selected from the group consisting of: a 3A molecular sieve and a 4A molecular sieve.

Aspect 36 is the method of Aspect 35, further including regenerating the adsorbent by heating the adsorbent to a temperature of from 90° C. to 120° C. to vaporize iodine adhered to the adsorbent, and then heating the adsorbent to from about 150° C. to about 350° C. to desorb the water from the adsorbent.

Aspect 37 is a method of recovering iodine ($I_2$), the method including providing a stream from an iodine ($I_2$) drying process, the stream including iodine ($I_2$) vapor, an inert gas and water vapor; contacting the stream with a concentrated acid to absorb the water vapor from the stream, the concentrated acid including sulfuric acid ($H_2SO_4$); and recycling the iodine ($I_2$) vapor to the iodine ($I_2$) drying process after the contacting step.

Aspect 38 a method of recovering iodine ($I_2$), the method including providing a stream from an iodine ($I_2$) drying process, the stream including iodine ($I_2$) vapor, an inert gas and water vapor, and desublimating or condensing the iodine ($I_2$) vapor to form solid or liquid iodine ($I_2$), wherein desublimating or condensing the iodine ($I_2$) vapor includes contacting the stream with a surface at a temperature from about 0° C. to about 100° C. to desublimate or condense the iodine ($I_2$) without solidifying the water vapor.

Aspect 39 a method of recovering iodine ($I_2$), the method including providing a stream from an iodine ($I_2$) drying process, the stream including iodine ($I_2$) vapor, an inert gas and water vapor, and desublimating or condensing the iodine ($I_2$) vapor to form solid or liquid iodine ($I_2$), wherein desublimating or condensing the iodine ($I_2$) vapor includes contacting the stream with water at a temperature of about 90° C. to about 150° C. to condense the iodine ($I_2$).

Aspect 40 a method of recovering iodine ($I_2$), the method including providing a stream from an iodine ($I_2$) drying process, the stream including iodine ($I_2$) vapor, an inert gas and water vapor, and desublimating or condensing the iodine ($I_2$) vapor to form solid or liquid iodine ($I_2$), wherein desublimating or condensing the iodine ($I_2$) vapor includes contacting the stream with liquid water to desublimate the iodine ($I_2$).

Aspect 41 is a method of recovering iodine ($I_2$), the method including providing a stream from an iodine ($I_2$)

drying process, the stream including iodine ($I_2$) vapor, an inert gas and water vapor, and contacting the stream with a material to condense or de-sublimate the iodine ($I_2$) vapor from the stream as the material at least one of: absorbs latent heat through a phase change of the material and absorbs sensible heat.

What is claimed is:

1. A method of recovering iodine ($I_2$), the method comprising:
   providing a stream including iodine ($I_2$) vapor and water vapor;
   contacting the stream with an adsorbent to selectively adsorb water from the stream, wherein the adsorbent is selected from the group consisting of 3A, 4A, 5A or XH-9 molecular sieves, alumina, calcium sulfate, silica gel, calcium chloride, sodium sulfate, calcium iodide, magnesium chloride, magnesium iodide, or combinations thereof.

2. The method of claim 1, wherein in the providing step, the stream is provided from an iodine ($I_2$) drying process.

3. The method of claim 2, further comprising recycling the iodine ($I_2$) vapor to the iodine ($I_2$) drying process after the contacting step.

4. The method of claim 1, further comprising desublimating the iodine ($I_2$) vapor after the contacting step to recover iodine ($I_2$).

5. The method of claim 1, further comprising regenerating the adsorbent by heating the adsorbent to a temperature of from 90° C. to 120° C. to vaporize iodine adhered to the adsorbent, and then heating the adsorbent to from about 150° C. to about 350° C. to desorb the water from the adsorbent.

6. The method of claim 1, wherein the stream further comprises an inert gas.

7. The method of claim 1, wherein the adsorbent comprises 4A molecular sieves.

8. The method of claim 1, wherein the adsorbent comprises 3A molecular sieves.

9. The method of claim 1, wherein the adsorbent comprises 5A molecular sieves.

10. The method of claim 1, wherein the adsorbent comprises XH-9 molecular sieves.

11. The method of claim 1, wherein the adsorbent comprises alumina.

12. The method of claim 1, wherein the adsorbent comprises calcium sulfate.

13. The method of claim 1, wherein the adsorbent comprises silica gel.

14. The method of claim 1, wherein the adsorbent comprises calcium chloride.

15. The method of claim 1, wherein the adsorbent comprises sodium sulfate.

16. The method of claim 1, wherein the adsorbent comprises calcium iodide.

17. The method of claim 1, wherein the adsorbent comprises magnesium chloride.

18. The method of claim 1, wherein the adsorbent comprises magnesium iodide.

19. The method of claim 1, further comprising reacting iodine from the iodine ($I_2$) vapor with hydrogen to produce hydrogen iodide.

20. The method of claim 19, further comprising employing the hydrogen iodide in a process for preparing an iodoalkane.

* * * * *